(12) United States Patent
Hildebrand et al.

(10) Patent No.: US 8,256,114 B2
(45) Date of Patent: Sep. 4, 2012

(54) METHOD OF MANUFACTURING A COOLING JACKET OF A CYLINDER HEAD

(75) Inventors: Olaf Hildebrand, Alsdorf (DE); André Küsters, Aachen (DE); Marc Grafen, Würselen (DE)

(73) Assignee: FEV GmbH, Aachen (DE)

( * ) Notice: Subject to any disclaimer, the term of this patent is extended or adjusted under 35 U.S.C. 154(b) by 1446 days.

(21) Appl. No.: 11/813,436

(22) PCT Filed: Dec. 22, 2005

(86) PCT No.: PCT/EP2005/013848
§ 371 (c)(1), (2), (4) Date: Jul. 19, 2007

(87) PCT Pub. No.: WO2006/072400
PCT Pub. Date: Jul. 13, 2006

(65) Prior Publication Data
US 2008/0092386 A1  Apr. 24, 2008

(30) Foreign Application Priority Data
Jan. 7, 2005 (DE) .......................... 10 2005 001 023

(51) Int. Cl.
*B23P 11/00* (2006.01)

(52) U.S. Cl. ..................... 29/888.06; 29/888; 29/888.01; 123/41.72; 123/41.79; 123/41.82 R; 123/193.2; 123/193.5; 164/113; 164/125; 164/126

(58) Field of Classification Search .................... 29/888, 29/888.01, 888.06; 123/41.72, 41.79, 41.82 R, 123/193.2, 193.5; 164/113, 125, 126
See application file for complete search history.

(56) References Cited

U.S. PATENT DOCUMENTS
5,333,581 A * 8/1994 Cagle .......................... 123/193.5

FOREIGN PATENT DOCUMENTS
DE          3546436          10/1986
* cited by examiner

*Primary Examiner* — Richard Chang
(74) *Attorney, Agent, or Firm* — Gifford, Krass, Sprinkle, Anderson & Citkowski, P.C.

(57) ABSTRACT

A cooling jacket casting core for the production of a cylinder head of an internal combustion engine. The cooling jacket casting core has a slot running at least in part substantially in the direction of a crankshaft longitudinal axis and separating the cooling jacket casting core in at least one section. The slot can run at least in part in an impression of the cooling jacket and can have at least one elevation arranged perpendicular to the longitudinal axis of the cooling jacket casting core.

3 Claims, 3 Drawing Sheets

METHOD OF MANUFACTURING A COOLING JACKET OF A CYLINDER HEAD

CROSS-REFERENCE TO RELATED APPLICATIONS

This application is the U.S. national phase application for the international patent application PCT/EP2005/013848 filed on Dec. 22, 2005 and having a priority date of Jan. 7, 2005, which is incorporated herein by reference.

FIELD OF THE INVENTION

The present invention concerns a cooling jacket casting core of a cylinder head of a multi-cylinder internal combustion engine as well as a cylinder head and an associated method for production of the cylinder head.

BACKGROUND OF THE INVENTION

An advancement of internal combustion engines with pistons leads as the result of a desired performance increase to a higher piston operating pressure. Particularly with the simultaneous demand for a low structural weight, this places increased demands for mechanical stability on a cylinder head. It has been attempted to respond by means of suitable cylinder head designs. For example, a rigid cylinder head is known from WO2004/038206 A1.

The problem of the present invention is to improve a load capacity of a cylinder head and to ensure easy fabrication of such a cylinder head.

SUMMARY OF THE INVENTION

This problem is solved according to the invention by a cooling jacket casting core of a cylinder head according to Claim 1, a cylinder head according to Claim 11 and a method for the production of a cylinder head according to Claim 20. Additional advantageous configurations and refinements are specified in the respective dependent claims.

A cooling jacket casting core according to the invention for the production of a cylinder head of an internal combustion engine comprises at least one impression of a cooling jacket. The cooling jacket casting core itself has a slot running at least in part substantially in the direction of a crankshaft longitudinal axis and separating the cooling jacket casting core in at least one section. In accordance with a further development, the slot runs at least in part in the impression of the cooling jacket. The slot preferably has at least approximately one elevation arranged perpendicular to the longitudinal axis of the cooling jacket casting core. This longitudinal extension of the slot runs parallel to a crankshaft associated with the cylinder head in an internal combustion engine.

By at least partial separation of the cooling jacket casting core when casting, an appropriate longitudinally extended structure is produced in the form of a web of cast material that is preferably connected to an upper deck and/or a flame deck. The inner impression of the cooling jacket constitutes the cooling jacket to be formed in the casting process. The impression of the cooling jacket preferably comprises several impressions for line connectors, in order to permit the inflow and outflow of a coolant, preferably water, in the resulting cooling jacket. Preferably the cooling jacket casting core forms an essentially cohesive volume perpendicular to a flame deck. In particular, circulation of a coolant between an upper deck and the flame deck is possible in the resulting cooling jacket.

The separating slot preferably extends over a full height of the cooling jacket casting core. In particular, a longitudinally-running structure that interconnects the upper deck and the flame deck results therefrom in the casting process.

In an advantageous variant, the slot extends at least approximately along the entire cooling jacket casting core. The separation preferably extends over an area assigned to cylinders in a cylinder head for an internal combustion engine. In an inline arrangement of cylinders, for example, the slot extends from a first to a last cylinder.

In another variant, it is provided for the slot to have an inverted lattice structure and/or an arch structure. Thus a lattice structure and/or an arch structure of cast material, which preferably connects the upper deck to the flame deck, is formed in the casting process. In particular, a lattice structure facilitates a light-weight construction, with preferably only slightly reduced stability. An arch structure is constructed, in particular, like the arch of a bridge.

In a preferential configuration it is provided that the cooling jacket casting core is in at least two parts. In particular, the cooling jacket casting core comprises at least a first part with an impression of a first cooling jacket and a second part with an impression of a second cooling jacket. Preferably both the first and the second part comprise impressions for the connection of at least one inflow and outflow line. Preferably both parts of the cooling jacket form cooling jackets through which there can be flows independent of one another.

For access to a cylinder to be covered with the cylinder head, it is provided in particular that, the cooling jacket casting core have at least one cavity, preferably at least approximately perpendicular to the longitudinal axis, for at least one dome or pipe, in particular, at least one injector and/or at least one gas inlet and/or outlet and/or a threaded fitting. For example, in one area of a cylinder of the cylinder head associated with an internal combustion engine, a respective pipe is provided for an injector for supplying a charge fluid, for a gas exchange valve and/or for an injection nozzle for fuel injection. The pipes to be provided can have an angle different from zero relative to the line perpendicular to the associated flame deck. The slot preferably transitions into a plurality of cavities and connects them, the cavities each belonging to an inverse image of a pipe and/or a dome.

For an improved cooling of a dome or a pipe, the cooling jacket casting core preferably has a connector in the vicinity of the cavity. This assures a flow of a coolant past the dome or the pipes in the future cylinder head.

The cooling jacket casting core is preferably a sand core. In accordance with another design, the casting core is manufactured by means of a rapid prototyping system. A rapid prototyping system is understood to mean an apparatus with which cross sections can be prepared from 3D-data sets by CAD systems, and the finished piece can then be produced by suitable manufacturing processes. For example, stereo lithography, selective laser sintering, LOM (Laminated Object Manufacturing) or, for example, FDM (Fused Deposition Modeling) can be used for this purpose.

In accordance with an additional conception of the invention, a cylinder head for a multi-cylinder internal combustion engine is provided which comprises at least a flame deck, an upper deck, and a fluid cooling jacket. The fluid cooling jacket is partitioned by means of a web that extends vertically and along the flame deck and the upper deck, at least over a section. The web preferably runs at least approximately parallel to a crankshaft associated with the cylinder head in an internal combustion engine. The web is preferably connected to the flame deck and/or the upper deck. The cooling jacket formed in the cylinder head preferably forms a cohesive volume perpendicular to the flame deck. In particular, a coolant circulation between flame deck and upper deck is possible. A reinforcement of the flame deck and/or the upper deck is preferably obtained with the web. In particular, the web can run in other than a straight line. For example, the web can run in a meandering shape, a zigzag shape or generally irregularly in the longitudinal direction. For instance, cylinder cross section surfaces of the internal combustion engine associated with the cylinder head can be intersected approximately centrally. In case of an approximately central contour, a cross section surface is divided, for example, into two surfaces of approximately the same size, wherein the contour of the web within a cross-section surface can be irregular. In particular different cross-section surfaces can be intersected in different manners by the web. Moreover the web can also run off center through the cross-sectional surfaces or alongside the cross-sectional surfaces.

In another variant, it is provided for the web to extend over a full height of the cylinder head between flame deck and upper deck. In particular the web interconnects flame deck and upper deck and preferably forms a reinforcement between flame deck and upper deck.

Particularly to reduce weight, the cylinder head is constructed so that the web is lattice-shaped and/or arch-shaped. For example the web is constructed in the manner of a bridge arch. Additionally the web is implemented, for example, in the form of lattice-like braces. The cylinder head preferably has a combination of both design features.

Preferably the web extends over at least approximately a length of the entire cylinder head. In particular, the web passes over an area of the cylinder head from a first to a last cylinder of an associated multi-cylinder internal combustion engine in which the cylinders are arranged in-line.

The web has a varying width of 0.3 to 15 mm, preferably, 3 to 10 mm. The width and thus a wall thickness of the web can preferably vary over a height and over a length of the web. For example, in a connecting area the web has a higher wall thickness, particularly at the flame deck and/or upper deck, than in a middle area between flame deck and upper deck. A wall thickness in an area of an increased heat input is preferably constructed more thinly than average, for an improved heat transfer.

For improved cooling of a dome or a pipe, the web is in preferably perforated in the area of the dome or the pipe. The opening is preferably constructed such that coolant flows around the dome or the pipe, in particular the dome of an injector.

Particularly to increase a stability of the cylinder head, the web is connected to at least one dome or a pipe. Depending upon position the web is connected, for example, in an inline multi-cylinder arrangement, to all injector domes and/or a row of valve pipes.

In an additional design it is provided for the fluid cooling jacket to comprise at least two coolant paths, in particular, with different volumes. For example the two coolant paths run on either side of the separation. The two coolant paths are preferably united at the respective longitudinal ends of the separation. For example, different fluid mass flows can flow through the two coolant paths, whereby, for example, intake and exhaust valves can be cooled with different intensities.

The fluid cooling jacket is preferably in at least two parts. In particular a separation of the cooling jacket into a first and a second cooling jacket is obtained. In addition, the separation is preferably implemented continuously over a length and a full height of the cylinder head, at least in an area from the first to a last cylinder of the internal combustion engine associated with the cylinder head. Preferably, separate coolant circuits with preferably different mass volume flows can flow independently of one another through the first and second cooling water jackets. A line connector for cooling water lines running on either side of the separation is preferably provided at each longitudinal end of the first and second cooling jackets.

Particularly for lightweight construction, it is provided that a light alloy, in particular a light metal alloy, be selected as the cylinder head material. Preferably aluminum and/or magnesium are selected as main constituent of the material. There is also the possibility of using grey cast iron as well as vermicular cast iron.

According to another conception of the invention a method for the production of a cooling jacket of a cylinder head of a multi-cylinder internal combustion engine is provided by means of a casting process wherein, for the production of the cooling jacket, a cooling jacket casting core is used that is arranged such that during casting a web arranged in the direction of a longitudinal axis is formed that separates the cooling jacket at least in sections and runs at least approximately perpendicular to a longitudinal extension of the cooling jacket.

A refinement provides that the cooling jacket casting core preferably be in at least two parts. This permits the manufacturing of very large casting cores from individual components that need only be subsequently put together. Thus the casting cores can be manufactured also for example by means of smaller casting core shooters.

In a preferred configuration it is provided that parts of the cooling jacket casting core be preferably connected to one another in at least one area of a cavity for forming a dome or a pipe, in particular an injector and/or gas intake and/or exhaust valve. Handling of the cooling jacket casting core, in particular, secure orientation of the parts relative to one another, is improved. It is particularly preferable for the connection to be accomplished in such a way that it becomes possible for there to be a flow past the formed dome or the formed pipe and, for example, an injector accommodated therein. Beside parts of the cooling jacket casting core, at least one additional part of a casting core, for example a casting core for a cylinder head intermediate deck, can also be considered for a connection. In particular all casting cores necessary for a cylinder head are connected before the casting process.

It is preferably provided that the parts of the cooling jacket casting core be adhered to one another for a connection. In addition, the parts can be positively connected to one another, preferably without any additional fastening.

A light metal or a light metal alloy is preferably used as casting material in order to achieve a lightweight construction. Preferably aluminum and/or magnesium are selected as predominant material constituent.

BRIEF DESCRIPTION OF THE DRAWINGS

Examples of the invention are described in detail below on the basis of the drawings. The characteristics therein are not limited to the respective individual configurations, however. Rather, the respective characteristics indicated in the drawings and/or in the description, including the description of figures, can be combined with one another for further development.

DETAILED DESCRIPTION OF THE PREFERRED EMBODIMENTS

Figure 1:
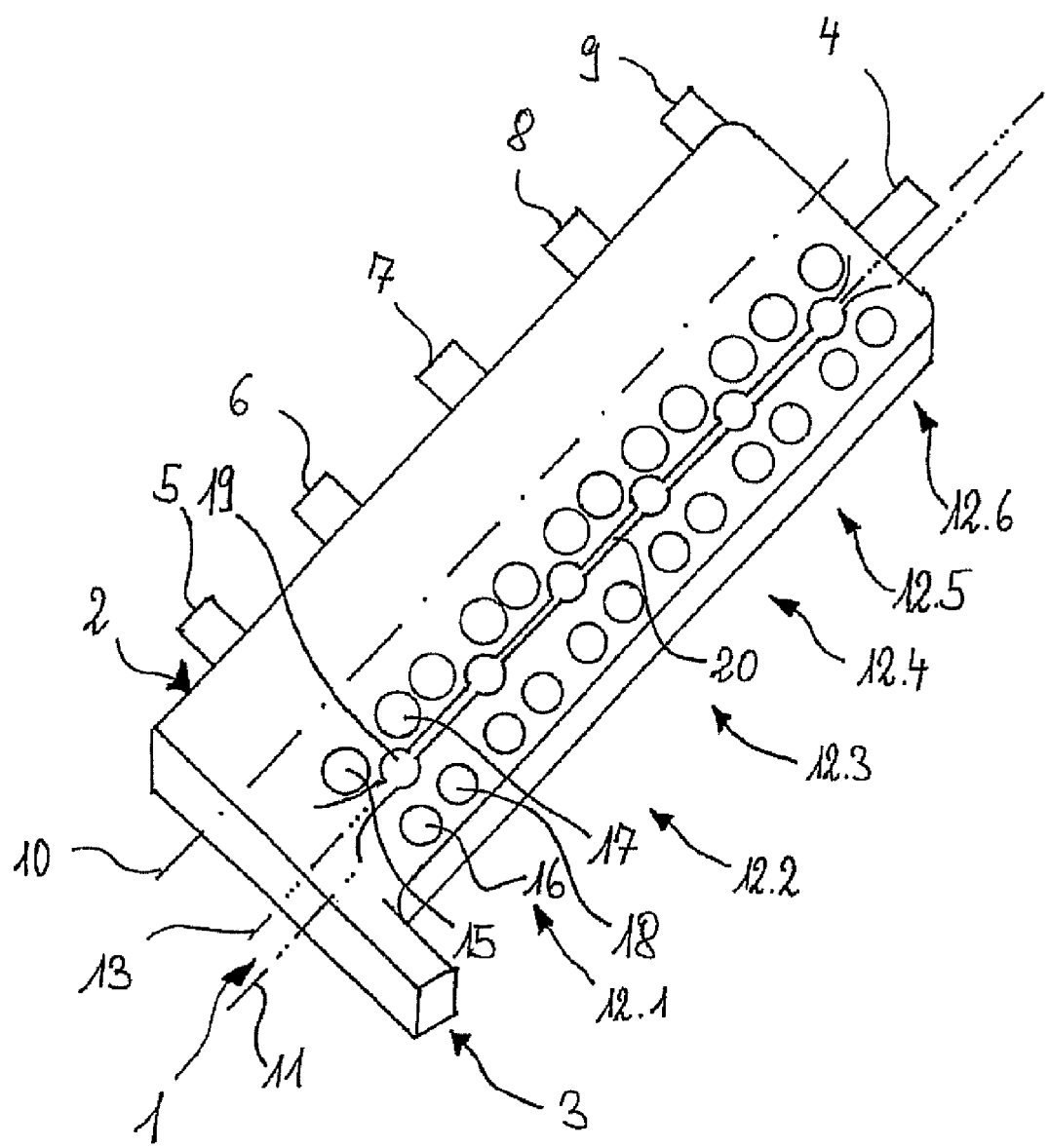
FIG. 1 shows a cooling jacket casting core of a cylinder head.
Figure 2:
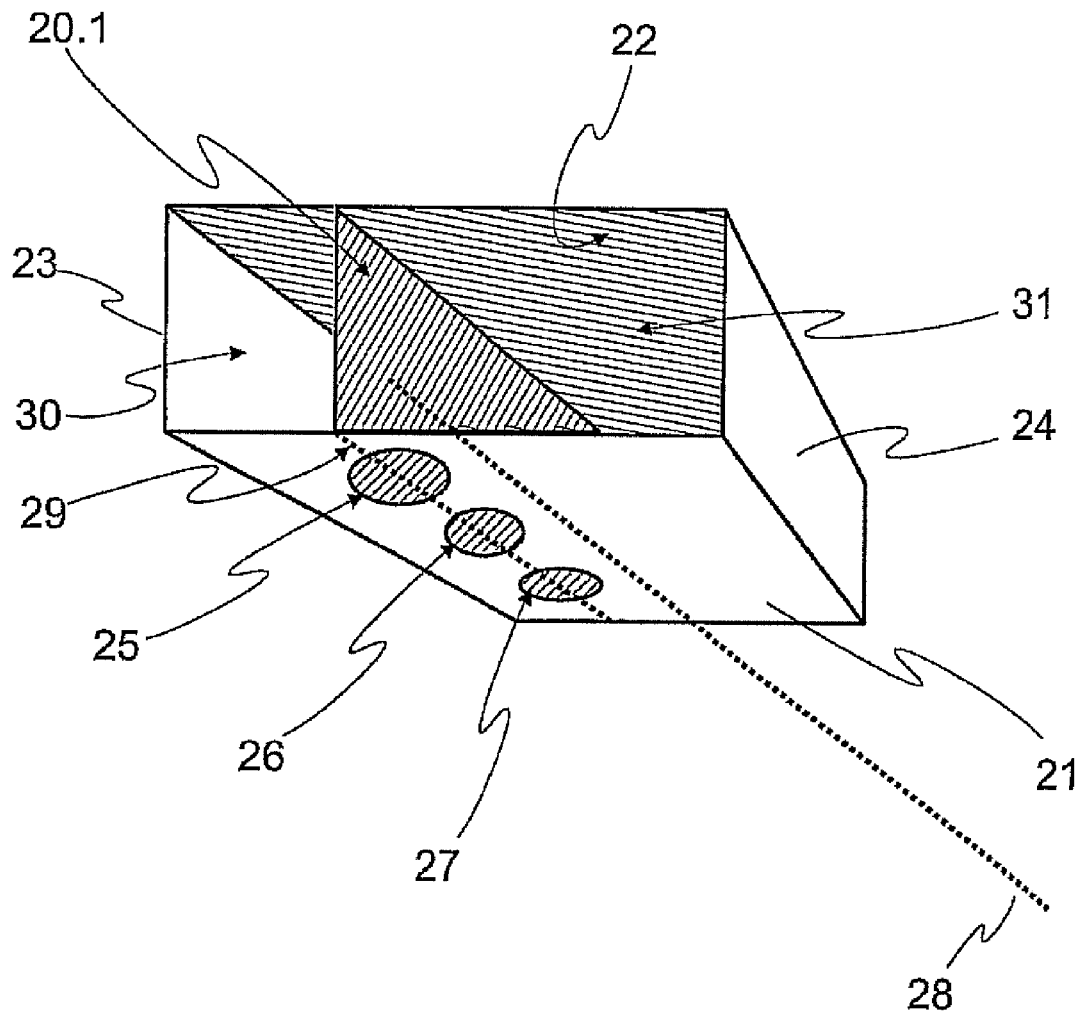
FIG. 2, a schematic cross section of a cylinder head.

FIG. 1 shows a cooling jacket casting core 1 of a cylinder head in a simplified, schematic view. This case pertains to a cylinder head for an inline six cylinder internal combustion engine. However, a cylinder head for any other multi-cylinder engine, for example a three or four-cylinder engine, can also be provided. Cooling jacket casting core 1 forms a hollow space in the cylinder head to be cast, and represents an internal impression of a cooling water jacket 2. Cooling jacket casting core 1 thus forms a coolant path, in particular a cooling water path, in an associated finished cylinder head. Corresponding line connectors are provided for supplying cooling water to the associated cylinder head. An impression of a first line connector 3 and a second line connector 4 is provided at the longitudinal ends of the cooling jacket casting core. Additional line connectors are also provided for additional coolant supply within the area of cavities for supplying the corresponding cylinders of the associated internal combustion engine, not shown here. On one longitudinal side are situated third line connector 5, fourth one 6, fifth one 7, sixth one 8, as well as a seventh one 9. Several cylinder supply areas are arranged along a first longitudinal axis 10, in particular a crankshaft longitudinal axis 11: a first cylinder supply area 12.1, a second one 12.2, third one 12.3, a fourth one 12.4, a fifth one 12.5 and a sixth one 12.6 with cavities for supplying the corresponding six cylinders, not shown here. A first cavity 15 7 second one 16, third one 17 as well as a fourth one 18 for pipes for gas exchange valves are arranged in each of these cylinder supply areas. A fifth cavity 19 for a dome for a spark or glow element is provided in the center of first cylinder supply area 12.1. Such cavities are provided accordingly in the remaining cylinder supply areas. Along a center line 13 of the cylinder supply areas runs a slot 20 of the cooling jacket casting core, which separates it. During a casting process, the area of slot 20 is filled with casting material and a web of cast material is formed FIG. 2 shows a schematic cross section of a cylinder head. This is a simplified representation of a cylinder head of a four-cylinder internal combustion engine, in which the section was made between a first and a second cylinder, neither shown here, associated with the cylinder head.

Equivalent elements are provided below with the same reference symbols and designations.

The cylinder head is drawn here for the sake of simplicity as a block that comprises a flame deck 21, an upper deck 22, a first side wall 23 and a second one 24, as well as end side walls, not shown here. Flame deck 21 comprises a first cylinder cover 25, a second one 26 and a third one 27 for the respective associated cylinders of the internal combustion engine, not shown here. These covers are arranged along a second longitudinal axis 28. A web 20.1, constructed as a vertical separation web here, is arranged in the cylinder head. This web 20.1 is arranged such that it runs centrally through cross sections of the cylinder covers. This is represented here by a projection 29 of web 20.1 on cylinder head base 21. Web 20.1 divides the cylinder head lengthwise into a first part 30 and a second part 31 of a cooling jacket. In this simplified example, a coolant can flow through in the longitudinal direction. Contrary to the simplified representation here, a cylinder head can be penetrated, in particular, approximately perpendicular to cylinder head base 217 by a dome or a pipe corresponding to the discussion regarding FIG. 1, in particular, for at least one gas exchange valve and/or an injector and/or a threaded fitting, for example. Moreover, the cylinder head can also comprise at least one intermediate deck.

Figure 3:
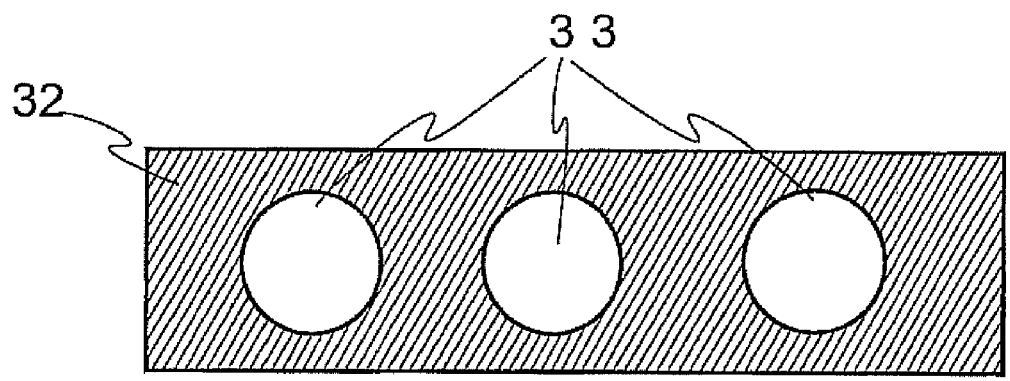
FIG. 3, a first web.

FIG. 3 shows a first web 32, in this case in a side view. This web is provided with circular cavities 33. These allow, in particular, a light-weight construction with at least approximately the same stability as a solid web. For example, the circular cavities 33 can be arranged such that in the vicinity of a pipe or a dome, in particular a dome for an injector, a flow around the latter is ensured. First web 32 can run completely straight in a plane that corresponds to the drawing plane. First web 32, however, can equally well run outside of this plane, at least in part. For example the first web 32 can run in a meandering shape, a zigzag shape or generally irregularly with respect to this plane. In particular, the first web 32 can be subjected to at least one torsion.

Figure 4:
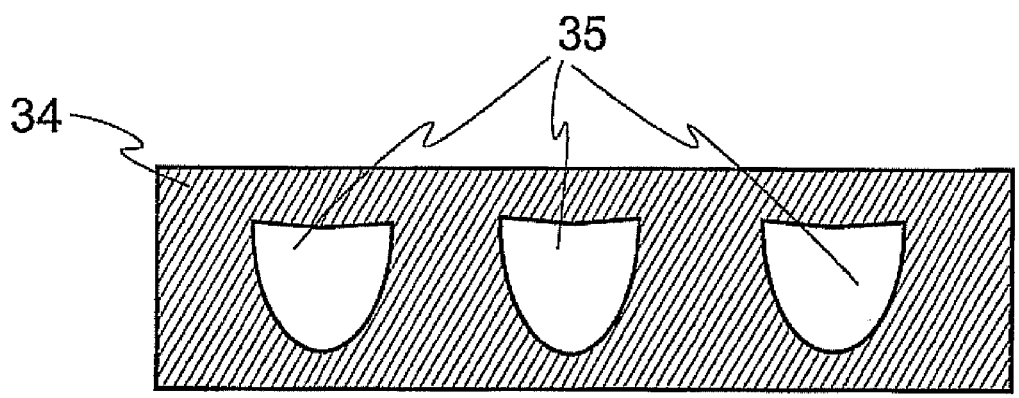
FIG. 4, a second web.

FIG. 4 shows a second web 34. This one has arch-shaped cavities 35. Just like circular cavities shown in FIG. 3, these allow, in particular, a light-weight construction with at least approximately the same stability as a solid web. Additionally, arch-shaped cavities 35 can be arranged such that a flow around the region of a pipe or a dome, in particular a dome of an injector, is ensured. Contrary to the representation shown here, the cavities can be also be asymmetrically constructed in such a manner as to improve, for example, the flow past a pipe or a dome. Just like the first web shown in FIG. 3, second web 34 can run also completely straight in one plane, which corresponds to the drawing plane. However, second web 34 can equally well also run at least partly outside of this plane. For example, the second web 34 can also run in a meander shape, a zigzag shape or generally irregularly relative to this plane. Second web 34 too can also be subjected to at least one torsion.

Figure 5:
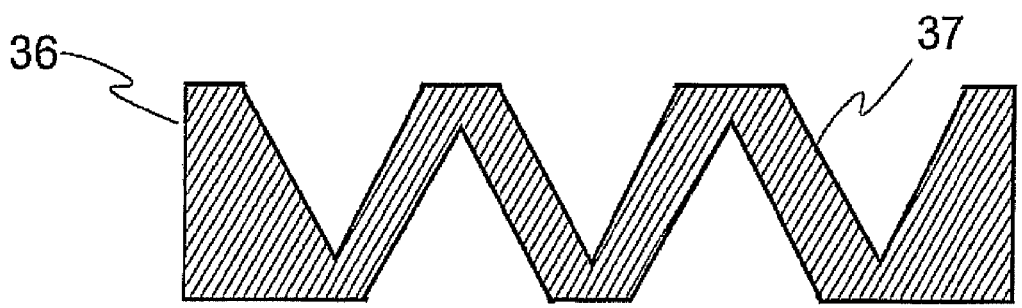
FIG. 5, a third web.

Finally, FIG. 5 shows a third web 36, which is constructed as lattice-rib structure 37. Contrary to the representation shown here, lattice rib structure 37 can also run irregularly. In particular, it can have curved sections so that, for instance, a sinusoidal side view results. Just like first web shown in FIG. 3, third web 36 can also run completely straight in one plane, which corresponds to the drawing plane. However, third web 36 can also equally well run at least partly outside of this plane. For example, third web 36 can also run in a meander shape, a zigzag shape or generally irregularly relative to this plane. Third web 36 can likewise be subjected to at least one torsion. In particular, third web 36 can be constructed such that inflection points of the zigzag structure lie in different planes.

The invention claimed is:

1. A method for the production of a cooling jacket of a cylinder head of a multi-cylinder internal combustion engine, said method comprising:
    providing a casting mold, the casting mold including the cooling jacket casting core having at least one impression of a cooling jacket and a slot extending substantially in a direction of a crankshaft longitudinal axis, the slot separating at least in a section of the cooling jacket casting core;
    pouring a liquid metal into the casting mold, the liquid metal forming the cylinder head of the multi-cylinder internal combustion engine with a flame deck, an upper deck and the fluid cooling jacket, the cooling jacket being partitioned at least in one section by a web, the web running vertically to and along with the flame deck and the upper deck; and
    waiting for the liquid metal to cool and solidify, the solidified metal forming the cooling jacket of the cylinder head of the multi-cylinder internal combustion engine.

2. The method according to claim 1, wherein the at least one impression of the cooling jack and the slot of the cooling jacket casting core (1) are adhered to one another.

3. The method according to claim 1, wherein the liquid metal is a light metal, a light metal alloy or a grey cast iron.

\* \* \* \* \*

UNITED STATES PATENT AND TRADEMARK OFFICE
CERTIFICATE OF CORRECTION

PATENT NO. : 8,256,114 B2
APPLICATION NO. : 11/813436
DATED : September 4, 2012
INVENTOR(S) : Olaf Hildebrand et al.

Page 1 of 1

It is certified that error appears in the above-identified patent and that said Letters Patent is hereby corrected as shown below:

In the Specification

At column 5, line number 28, Delete "157" Insert -- 15 --

At column 5, line number 60, Delete "217" Insert -- 21 --

In the Claims:

At column 6, line number 60, Delete "jack" Insert -- jacket --

Signed and Sealed this
Tenth Day of December, 2013

Margaret A. Focarino
*Commissioner for Patents of the United States Patent and Trademark Office*